(12) United States Patent
Nakamura

(10) Patent No.: US 10,447,943 B2
(45) Date of Patent: Oct. 15, 2019

(54) IMAGE CAPTURING APPARATUS, CONTROL METHOD, PROGRAM, AND RECORDING MEDIUM THEREFOR

(71) Applicant: CANON KABUSHIKI KAISHA, Tokyo (JP)

(72) Inventor: Hinako Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/891,182

(22) Filed: Feb. 7, 2018

(65) Prior Publication Data
US 2018/0234610 A1  Aug. 16, 2018

(30) Foreign Application Priority Data

Feb. 14, 2017  (JP) .................................. 2017-025381

(51) Int. Cl.
| | |
|---|---|
| H04N 5/232 | (2006.01) |
| H04N 5/235 | (2006.01) |
| H04N 5/262 | (2006.01) |
| H04N 5/77 | (2006.01) |
| H04N 5/783 | (2006.01) |
| G03B 7/00 | (2014.01) |

(52) U.S. Cl.
CPC ......... *H04N 5/2357* (2013.01); *H04N 5/2351* (2013.01); *H04N 5/2353* (2013.01); *H04N 5/23245* (2013.01); *H04N 5/2625* (2013.01); *H04N 5/772* (2013.01); *H04N 5/783* (2013.01); *G03B 7/00* (2013.01)

(58) Field of Classification Search
CPC ............. H04N 5/23245; H04N 5/2351; H04N 5/2352; H04N 5/2353; H04N 5/2354; H04N 9/735; G03B 7/00

USPC ............................................... 348/223.1, 362
See application file for complete search history.

(56) References Cited

U.S. PATENT DOCUMENTS

| | | | | |
|---|---|---|---|---|
| 8,553,138 | B2 * | 10/2013 | Makii ................ | H04N 5/23245 |
| | | | | 348/224.1 |
| 2015/0222799 | A1 * | 8/2015 | Noorkami ............ | H04N 5/2352 |
| | | | | 348/223.1 |
| 2017/0118390 | A1 * | 4/2017 | Miyazaki ............. | H04N 5/2352 |

FOREIGN PATENT DOCUMENTS

JP  2014-235183 A  12/2014

* cited by examiner

*Primary Examiner* — Thai Q Tran
*Assistant Examiner* — Syed Y Hasan
(74) *Attorney, Agent, or Firm* — Canon U.S.A., Inc. IP Division

(57) ABSTRACT

An image capturing apparatus includes a setting unit configured to set an exposure for image capturing by an image capturing unit, wherein in a mode for acquiring a plurality of images for a moving image by performing intermittent image capturing using the image capturing unit, the setting unit smooths data on a brightness corresponding to a plurality of image capturing operations in the intermittent image capturing and sets an exposure for one image capturing operation in the intermittent image capturing according to the smoothed data, and an acquisition unit configured to acquire first information including at least one of an image capture interval for the intermittent image capturing, a frame rate of the moving image, and shake information during image capturing of a subject. The setting unit determines a degree of the smoothing based on the first information acquired by the acquisition unit.

12 Claims, 9 Drawing Sheets

IMAGE CAPTURING APPARATUS, CONTROL METHOD, PROGRAM, AND RECORDING MEDIUM THEREFOR

BACKGROUND

Field

The present disclosure relates to an image capturing apparatus that executes intermittent image capturing, a control method, a program, and a recording medium for the image capturing apparatus.

Description of the Related Art

As a technique for executing intermittent image capturing at predetermined time intervals, so-called interval image capturing has been known. In addition, a technique for acquiring a moving image (so-called time-lapse moving image) in which temporal changes of a subject are compressed and expressed by sequentially connecting images acquired by executing intermittent image capturing has also been known. A reproduction time for reproducing a moving image which is acquired from a period required from the start of a first image capturing operation for a time-lapse moving image to the end of a last image capturing operation is shorter than the period.

Japanese Patent Application Laid-Open No. 2014-235183 raises an issue that, in a case where an automatic exposure control is executed in each image capturing operation in interval image capturing, great changes in brightness between frames acquired in the image capturing operations may cause a user to feel uncomfortable when the user continuously views frames. To solve such a problem, Japanese Patent Application Laid-Open No. 2014-235183 proposes a technique for smoothing a current proper exposure value determined by automatic exposure control processing in interval image capturing based on a history of proper exposure values obtained by the automatic exposure control processing during the past image capturing operations.

SUMMARY

According to various embodiments of the present disclosure, an image capturing apparatus includes an image capturing unit configured to capture an image of a subject, at least one processor configured to execute a program stored in at least one non transitory memory so as to function as units comprising, a setting unit configured to set an exposure for image capturing by the image capturing unit, wherein in a mode for acquiring a plurality of images for a moving image by performing intermittent image capturing using the image capturing unit, the setting unit smooths data on a brightness corresponding to a plurality of image capturing operations in the intermittent image capturing and sets an exposure for one image capturing operation in the intermittent image capturing according to the smoothed data, and an acquisition unit configured to acquire first information including at least one of an image capture interval for the intermittent image capturing, a frame rate of the moving image, and shake information during image capturing of the subject, wherein the setting unit determines a degree of the smoothing based on the first information acquired by the acquisition unit.

Further features will become apparent from the following description of exemplary embodiments with reference to the attached drawings.

DESCRIPTION OF THE EMBODIMENTS (Basic Configuration of Digital Camera 1)

Figure 1:
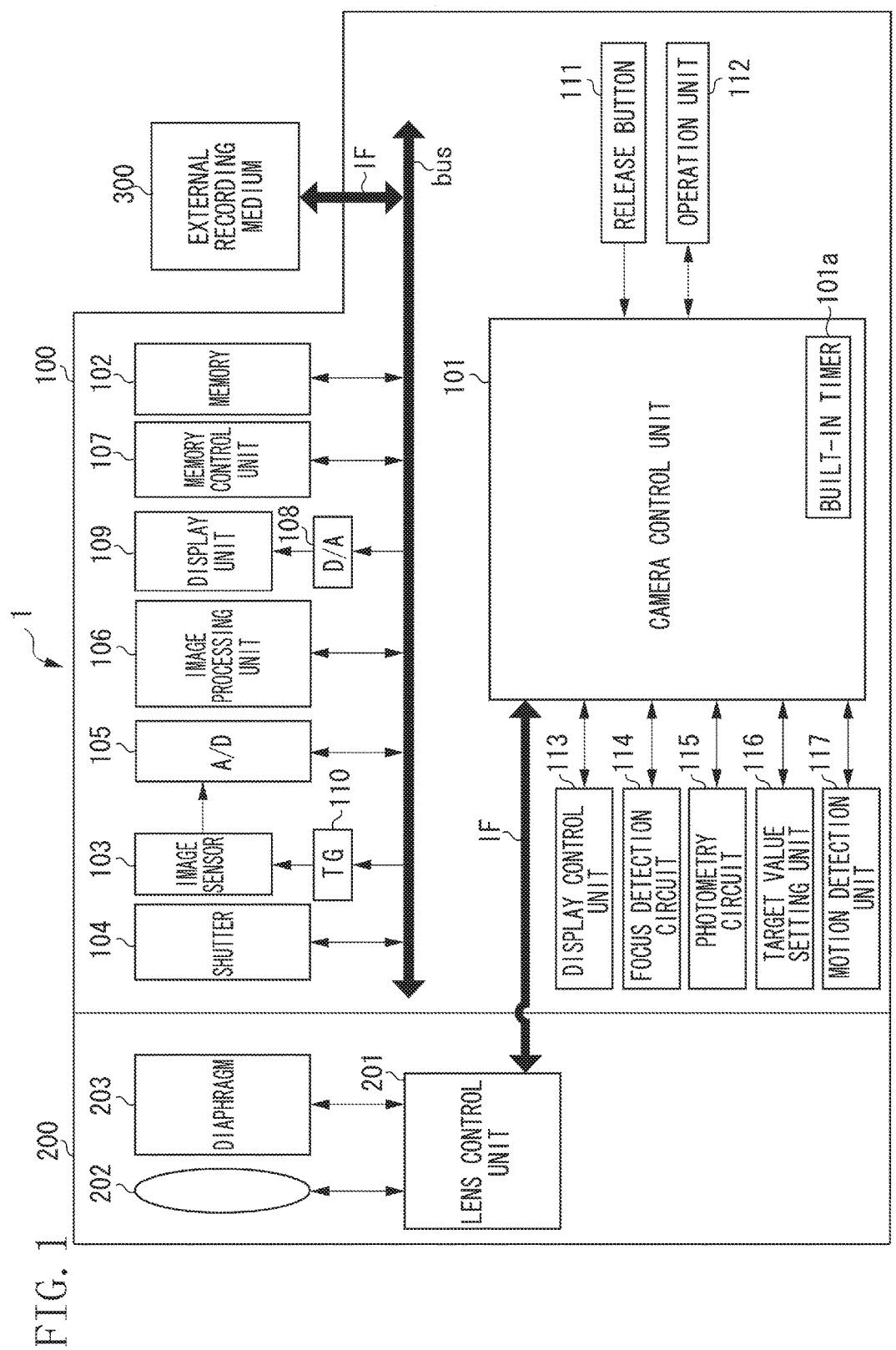
FIG. 1 is a block diagram illustrating a configuration example of a digital camera as an exemplary embodiment of an image pickup apparatus on which one embodiment of the present disclosure is implemented.

An exemplary embodiment of the present disclosure will be described below with reference to the accompanying drawings. FIG. 1 is a block diagram illustrating a configuration example of a digital camera (hereinafter referred to simply as a camera) 1 as an exemplary embodiment of an image capturing apparatus on which one embodiment of the present disclosure is implemented. One or more functional blocks illustrated in FIG. 1 may be implemented by hardware such as an application specific integrated circuit (ASIC) or a programmable logic array (PLA), or may be implemented by causing a programmable processor, such as a central processing unit (CPU) or a micro processing unit (MPU), to execute software. The one or more functional blocks may be implemented by a combination of software and hardware. Therefore, in the following description, even when different functional blocks are described as the elements carrying out operations, those functional blocks can possibly be implemented by the same hardware.

As illustrated in FIG. 1, the camera 1 according to the present exemplary embodiment includes a camera body 100 and a lens unit 200. The lens unit 200 is freely detachably mounted on the camera body 100. The configuration of the camera 1 in a state where the lens unit 200 is connected (attached) to the camera body 100 will be described below with reference to FIG. 1. The camera 1 may have a configuration in which the camera body 100 and the lens unit 200 are integrally formed.

As illustrated in FIG. 1, a camera control unit 101 is a camera control unit that controls the operations of the camera 1 in an integrated manner, and includes a camera CPU as a microprocessor (computer) for control. The camera control unit 101 includes a built-in timer 101a which is capable of measuring time. The built-in timer 101a is a so-called real-time clock and executes time measurement in each operation based on information about timer intervals, such as hours, minutes, and seconds, which are preliminarily stored in a memory 102, which is described below, and time zones set during initial setting of the camera 1. The camera control unit 101 executes various control operations and processing based on computer control programs stored in the memory 102 described below.

The memory 102 is a recording medium capable of recording data on the operations of the camera 1 and various data acquired using the camera 1. The memory 102 according to the present exemplary embodiment includes a read-only memory (ROM) area as a non-volatile memory and a random access memory (RAM) area as a volatile memory.

A lens control unit 201 is a lens control unit that controls the operation of the lens unit 200 in an integrated manner, and includes a lens CPU as a microprocessor (computer) for lens control. In a state where the lens unit 200 is mounted on the camera body 100, the lens control unit 201 can communicate with the camera body 100 via an interface (IF) illustrated in FIG. 1. An imaging lens group 202 is a lens group including a plurality of lenses such as a shift lens, a zoom lens, and a focus lens. The imaging lens group 202 is an optical member for focusing a light beam corresponding to an optical image of a subject onto an image sensor 103 which is provided in the camera body 100. A diaphragm 203 is a light amount adjustment member for adjusting the amount of light corresponding to the light beam which has entered through the imaging lens group 202.

The image sensor 103 is an image capturing unit for which a charge accumulation type solid-state image sensor, such as a charge coupled device (CCD) sensor or complementary metal oxide semiconductor (CMOS) sensor, is adopted. The image sensor 103 photoelectrically converts the light beam focused on an image capturing plane of the image sensor 103 and outputs analog image data (analog image signal).

A shutter 104 is a shielding member that can shield the light beam incident on the image sensor 103. The shutter 104 can transit to a retracted state where the incident light beam is guided to the image sensor 103 without being shielded, and a shielding state where the incident light is shielded.

An A/D conversion unit 105 is an A/D conversion unit that converts the analog image data output from the image sensor 103 into digital image data. An image processing unit 106 is an image processing unit that performs predetermined image interpolation processing, resizing processing, such as reduction, and color conversion processing on the digital image data, and calculation processing of calculating the number of pieces of pixel data on saturated pixels, under-exposed pixels, and the like. The image processing unit 106 is a white balance (hereinafter referred to simply as WB) processing unit that performs WB calculation processing on the digital image data. The WB calculation processing enables WB adjustment of image data under various conditions by multiplying signal values of color signals (signals of an RGB Bayer array) corresponding to the image data output from the image sensor 103 by a predetermined WB coefficient. The predetermined WB coefficient refers to the amount of gain that is different for each color signal. The WB coefficient is set based on, for example, data stored in advance for predetermined ambient light conditions, data calculated based on a color temperature manually set by a user, or data calculated by extracting signal values of color signals from acquired image data.

A D/A conversion unit 108 is a D/A conversion unit that converts the digital image data into analog image data for display. A memory control unit 107 is a recording control unit that controls input and output of image data to the units, such as the A/D conversion unit 105, the image processing unit 106, and the D/A conversion unit 108. The camera 1 according to the present exemplary embodiment includes the image sensor 103 as the image capturing unit. Alternatively, for example, a configuration including the A/D conversion unit 105 and the image processing unit 106 may be used as the image capturing unit.

A timing generator (hereinafter referred to as TG) 110 is a timing generation unit that outputs timing signals associated with the operations of the camera 1 to each unit of the camera 1. For example, the TG 110 can output timing signals associated with various operations such as charge accumulation in the image sensor 103, changing of a frame rate, and changing of the state of the shutter 104.

A display unit 109 is a display including a thin film transistor (TFT) type liquid crystal display (LCD) device (a thin film transistor driving type liquid crystal display device), and can display analog image data for display. The display unit 109 can display a so-called live view display (hereinafter referred to as LV display) for sequentially displaying image data acquired using the image sensor 103. The display unit 109 can also display various information other than the acquired image data.

A release button 111 is an image capture instructing unit for still images to issue an instruction to start an image capturing preparation operation for a still image of a subject and an image capturing operation for a still image. An instruction to start an image capturing operation for a moving image for recording may be issued by operating the release button 111. In the camera 1 according to the present exemplary embodiment, the user brings the release button 111 into an SW1 state (e.g., a half-pressed state), whereby an instruction to start the image capturing preparation operation for a still image is issued to execute focus control, photometry operation, and the like as described below. The user brings the release button 111 into an SW2 state (e.g., a fully-pressed state), whereby an instruction to start the image capturing operation for a still image using the shutter 104 is issued to execute a series of processing in which images of a subject are captured to acquire still images and moving images to be recorded.

Figure 2:
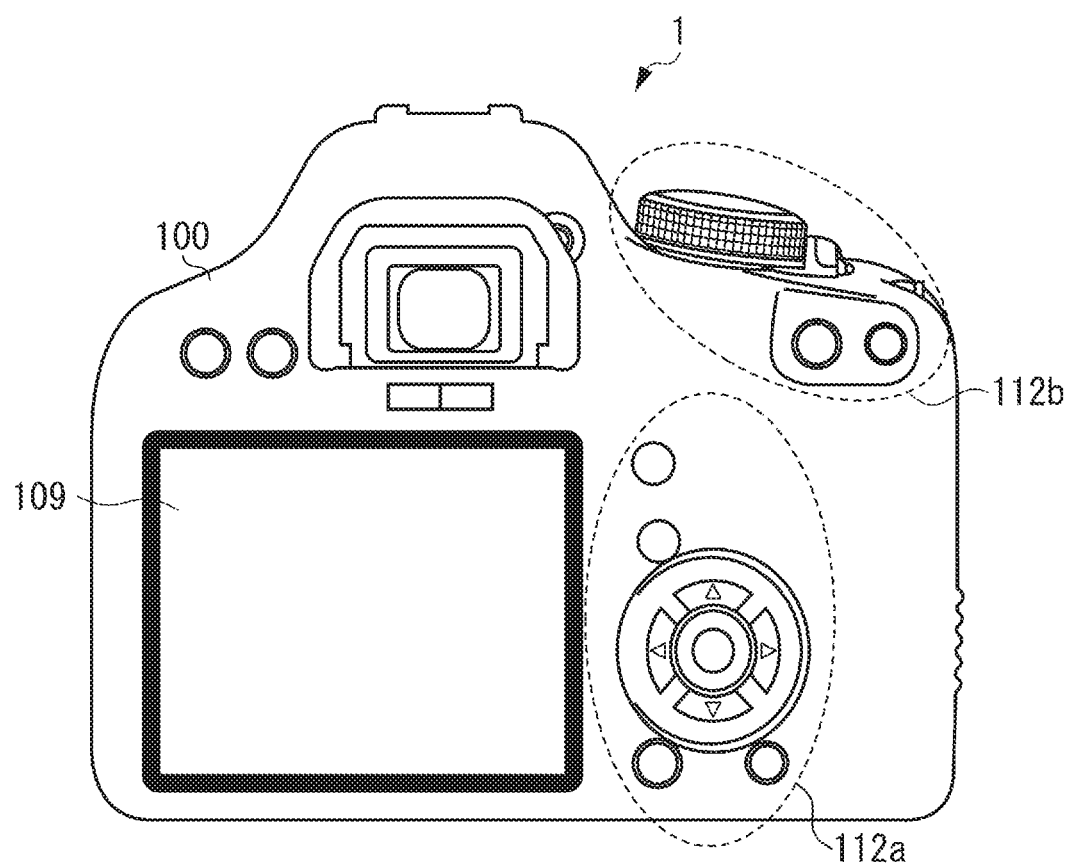
FIG. 2 is an appearance view (rear view) illustrating the digital camera according to an exemplary embodiment.

An operation unit 112 is an operation unit for inputting various operation instructions to the camera control unit 101 according to a user's manual operation. FIG. 2 is an appearance view (rear view) illustrating the camera 1 according to the present exemplary embodiment. Areas each surrounded by a dashed line illustrated in FIG. 2 represent a first operation unit 112a and a second operation unit 112b, respectively. The first operation unit 112a includes a direction instruction button for instructing various operations associated with image capturing, and a live view (LV) button for instructing execution and termination of the LV display on the display unit 109. The second operation unit 112b includes a power supply switch and a mode dial for setting an image capturing mode. The display unit 109 may function as an operation unit capable of inputting each operation as described above as long as a capacitive touch panel or the like is adopted as the display unit 109. A display control unit 113 is a display control unit that controls an image display on the display unit 109. The display control unit 113 can select image data to be displayed on the display unit 109 according to an instruction from the camera control unit 101, and can set turning on/off (display/non-display) of the display unit 109.

A focus detection circuit 114 is a focus detection unit that includes a focus sensor (not illustrated) and detects an in-focus state of an optical image corresponding to a light beam which has entered from the lens unit 200. The focus detection circuit 114 can calculate distance information from the camera 1 to a predetermined subject based on a focus detection result. The detection result of the focus detection circuit 114 is used for controlling (focus control) the lens position of the focus lens (not illustrated) included in the lens unit 200. The light beam which has entered through the imaging lens group 202 is guided to the image sensor 103 and the focus sensor by a mirror (not illustrated). The camera 1 according to the present exemplary embodiment is configured to execute the focus control based on the output from the focus detection circuit 114 by using a phase difference detection method. Alternatively, the camera 1 according to the present exemplary embodiment may have a configuration using a contrast detection method based on contrast information of image data. The camera 1 according to the present exemplary embodiment includes the focus sensor separately from the image sensor 103, but instead may be configured to execute focus detection based on data output from pixels that enable focus detection and are included in the image sensor 103, instead of including the focus sensor.

A photometry circuit 115 is a photometry unit that includes a photometry sensor (not illustrated) and calculates a photometric value corresponding to a light beam which has entered from the lens unit 200. The photometry result of the photometry circuit 115 is output to the camera control unit 101 and is used for exposure control. A method for calculating a luminance value will be described in detail. First, the acquired image data is divided into a plurality of blocks, and average luminance values for each block are calculated. The average luminance values for each block are integrated to acquire a representative luminance value. In the following description, the representative luminance value is used for various processing and control operations, such as exposure control, as the photometric value for a subject. In the present exemplary embodiment, the photometry calculation is executed using the photometry sensor, but instead the photometry calculation may be executed based on the output from the image sensor 103.

A target value setting unit 116 is a target value setting unit that sets a target value for exposure control and a target value for WB adjustment based on the photometry result for the subject. Specifically, in the case of acquiring an image using the image sensor 103, the target value setting unit 116 sets a target value that is associated with the brightness of the image and is used to change the brightness in a predetermined number of frames. In the present exemplary embodiment, in the case of acquiring a moving image for recording and a moving image for LV display, the photometry circuit 115 is configured to perform photometry on the subject for each of the predetermined number of frames and calculate a photometry value. The target value setting unit 116 sets the target value for exposure and the target value for WB adjustment based on the photometric value.

If the amount of exposure or WB adjustment is sharply changed toward the target value during the acquisition of a moving image, the brightness is frequently changed between the frames constituting the moving image, which gives the user an uncomfortable feeling. Accordingly, the target value setting unit 116 may include a predetermined amount of hysteresis (blind zone) for the set target value, and may be configured not to change the amount of exposure and WB within the range of the hysteresis. In this case, if a predetermined amount or more of luminance change occurs based on the set exposure, an actual exposure (referred to as control exposure) is changed toward a target exposure.

A motion detection unit 117 is a motion detection unit that detects a change in orientation or an amount of shake (angular velocity, acceleration, etc.) of the camera 1 based on, for example, an output result from a gyro sensor (not illustrated). The camera control unit 101 or the like may compare a plurality of images output from the image sensor 103 to calculate a motion vector for a subject and detect the motion vector as a change in orientation or an amount of shake of the camera 1.

An external recording medium 300 is a recording medium, such as a memory card or a hard disk, which is detachably mounted on the camera body 100. For example, the external recording medium 300 can record images acquired by capturing images of a subject. As the external recording medium 300 according to the present exemplary embodiment, a memory card that can be inserted into and removed from the camera body 100 is adopted. However, the external recording medium 300 is not limited to a memory card, but instead may be an optical disk such as a DVD-RW disk, or a magnetic disk such as a hard disk. The camera 1 according to the present exemplary embodiment has a basic configuration as described above.

(Image Capturing Modes)

Image capturing modes that can be set by the camera 1 will be described below. The camera 1 according to the present exemplary embodiment can set a normal still image mode, a normal moving image mode, and a time-lapse mode as image capturing modes.

The normal still image mode is an image capturing mode for acquiring a single piece of image data (still image) for recording. The normal moving image mode is an image capturing mode for acquiring image data (moving image) based on a plurality of image data groups continuously acquired at predetermined time intervals by using the image sensor 103. For example, in the normal moving image mode, image capturing of each frame is carried out at an interval of 1/60 seconds. The frames of the moving image that is captured in the normal moving image mode and recorded are reproduced at an interval of 1/60 seconds for display, like in the case of recording. The time-lapse mode is an image capturing mode for generating image data (time-lapse moving image) obtained by sequentially connecting a plurality of pieces of image data acquired by executing intermittent image capturing at an interval (e.g., at a time interval of one second or longer) that is longer than that in the normal moving image mode.

The present exemplary embodiment illustrates a configuration in which, when the time-lapse mode is set, time-lapse moving images are generated (combined) in the image capturing apparatus. However, the configuration of the present disclosure is not limited to this configuration. For example, the time-lapse mode may be at least an image capturing mode in which intermittent image capturing for time-lapse moving images is executed in the image capturing apparatus, and the time-lapse moving images may be generated (combined) by a signal processing apparatus or the like that is provided outside of the image capturing apparatus.

A relative relationship between a reproduction time for a moving image to be acquired and a total image capturing time required for acquiring the moving image (a period required from the start of a first image capturing operation to the end of a last image capturing operation) in the normal moving image mode is different from that in the time-lapse mode. Specifically, in the normal moving image mode, the total image capturing time required for acquiring a single moving image is substantially the same as a reproduction time for reproducing the moving image. On the other hand, in the time-lapse mode, a reproduction time for reproducing a single time-lapse moving image is shorter than the total image capturing time required for acquiring the time-lapse moving image. Accordingly, in the time-lapse moving image acquired in the time-lapse mode, temporal change of a subject can be compressed.

In the time-lapse mode, the user can arbitrarily set an image capture interval for interval image capturing from among preliminarily set predetermined image capture intervals (time intervals) such as one second, 30 seconds, one minute, 15 minutes, 30 minutes, one hour, three hours, five hours, 10 hours, and 24 hours. The user may freely set any image capture interval. For example, the image capture interval may be longer than 24 hours, or the image capture interval may be shorter than one second.

In addition, in the time-lapse mode, the total image capturing time (or the total number of image capturing operations) required from the start of a plurality of intermittent image capturing operations to the end of the operations can be set. Further, in the time-lapse mode, intermittent image capturing can be executed, without limitation, as long as power is supplied from a power supply (not illustrated) such as a battery provided in the camera 1, regardless of the total image capturing time or the total number of image capturing operations. The image capturing modes described above can be freely set by the user operating the operation unit 112.

The camera 1 according to the present exemplary embodiment is configured to carry out interval image capturing at image capture intervals, which are preliminarily set by the user, in the time-lapse mode, to generate a time-lapse moving image by connecting still images acquired intermittently. Alternatively, the camera 1 according to the present exemplary embodiment may be configured to acquire a moving image by using the image sensor 103 and intermittently extract images to be used for generating a time-lapse moving image at preliminarily set image capture intervals from among the images constituting the moving image. When this configuration is adopted, the number of charge accumulation rows in the image sensor 103 during image capturing of a subject is reduced (charge accumulation is performed by thinning out pixel rows) to thereby reduce a processing load on the camera 1 during image capturing of a subject, unlike in the case of intermittently acquiring still images.

(Image Capturing Processing in Time-lapse Mode)

Figure 3:
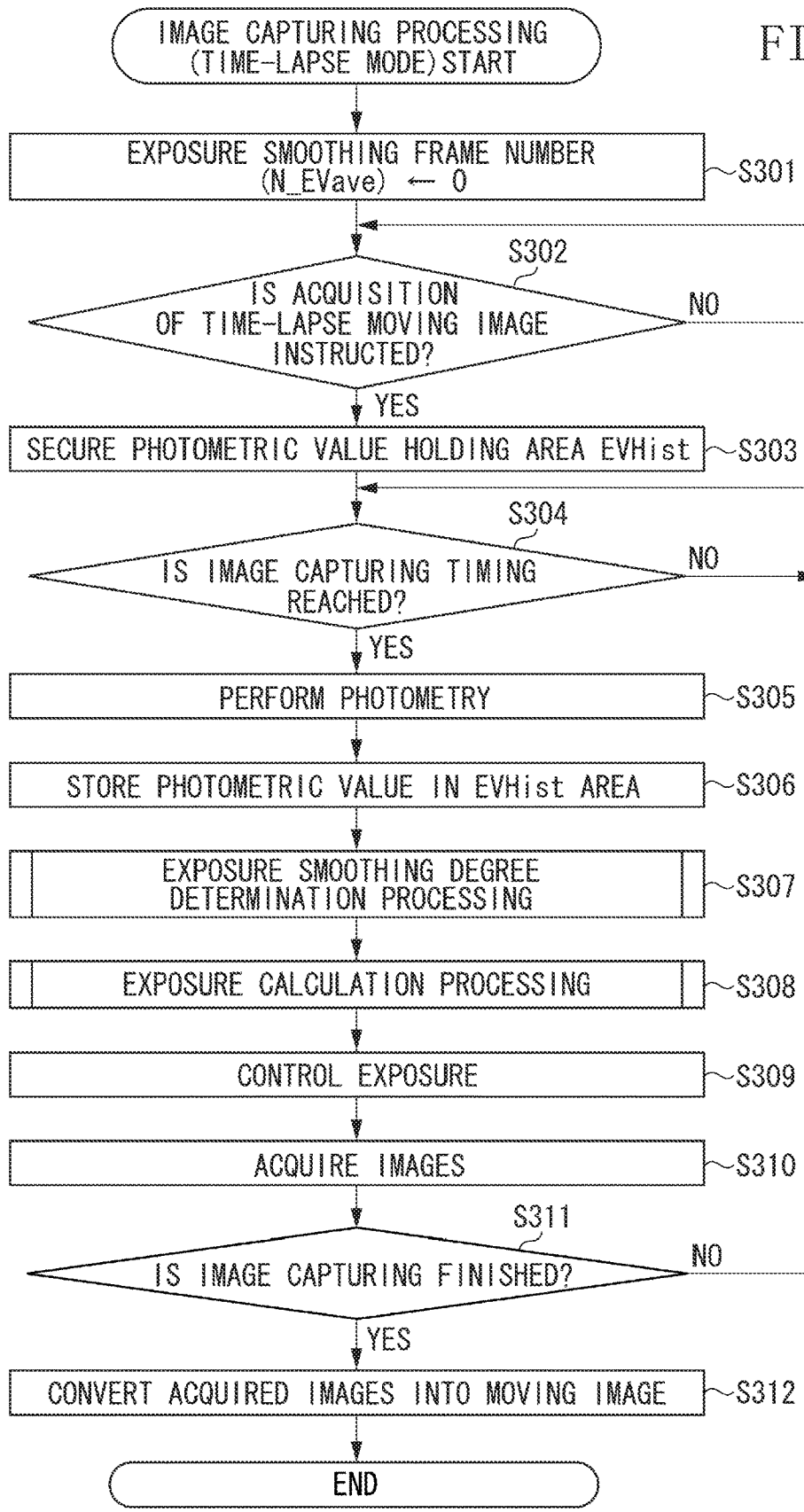
FIG. 3 is a flowchart illustrating image capturing processing in a time-lapse mode according to an exemplary embodiment.

Image capturing processing in the time-lapse mode will be described below with reference to FIG. 3. FIG. 3 is a flowchart illustrating image capturing processing in the time-lapse mode according to an exemplary embodiment of the present disclosure. When the time-lapse mode is set as an image capturing mode, in step S301, the camera control unit 101 initializes the value of an exposure smoothing frame number N_EVave indicating a degree of smoothing of exposure during image capturing of a subject to "0". Smoothing of exposure will be described in detail below.

Next, in step S302, the camera control unit 101 determines whether the acquisition of a time-lapse moving image is instructed. The camera 1 according to the present exemplary embodiment determines whether the start of acquisition of images (referred to as time-lapse images) to be used for generating a time-lapse moving image (the start of image capturing of a subject) is instructed by, for example, the user operating the operation unit 112. In other words, in the processing of step S302, it is determined whether the acquisition of an image corresponding to a first frame in a single time-lapse moving image is instructed.

If the acquisition of a time-lapse moving image is instructed (YES in step S302), the processing proceeds to step S303, and the camera control unit 101 secures a photometric value holding area EVHist for holding the photometric value acquired by performing photometry on a subject as described below. In the present exemplary embodiment, the photometric value holding area EVHist is loaded in the memory 102.

Next, in step S304, the camera control unit 101 monitors a time-lapse image acquisition timing (subject image capturing timing) based on the count of the built-in timer 101a. Intermittent image capturing of a subject for generating a time-lapse moving image is executed based on a preliminarily set image capture interval upon a condition that the time measured from the previous image capturing operation reaches the image capture interval. In the first image capturing operation in intermittent image capturing for acquiring a single time-lapse moving image, image capturing of a subject may be carried out, without using the count of the built-in timer 101a, in response to a time-lapse moving image acquisition instruction from the user. Alternatively, any time interval for the first image capturing operation may be set and image capturing of a subject may be carried out when the time measured by the built-in timer 101a reaches the time interval after the acquisition of a time-lapse moving image is instructed. The processing of step S304 is repeated until the image capturing timing is reached.

Upon a condition that the image capturing timing is reached (YES in step S304), in step S305, the photometry circuit 115 calculates a photometric value for the subject. The photometric value is calculated by the method described above. When the photometry calculation is completed, the processing proceeds to step S306, and the camera control unit 101 stores the last calculated photometric value in the previously secured photometric value holding area EVHist.

Next, in step S307, the camera control unit 101 executes exposure smoothing degree determination processing for smoothing exposure during image capturing of a subject. In general, the time interval for acquiring a plurality of images constituting a moving image is longer than that for acquiring a normal moving image. Accordingly, like in the case of acquiring a normal moving image, when the exposure during image capturing is set to follow a change in the brightness of the subject for each predetermined frame, the degree of change in the brightness of the subject between the images (predetermined frames) included in the time-lapse moving image becomes sharp. In the time-lapse moving image acquired by performed the exposure control as described above, unnatural flickering occurs due to a rapid change in the brightness of the subject between the predetermined frames.

To solve this problem, in the case of acquiring a time-lapse moving image, the effect of flickering can be suppressed by applying a technique for smoothing the exposure during image capturing in intermittent image capturing for generating the time-lapse moving image. Specifically, in each of intermittent image capturing operations, the exposure used for the past image capturing operation for generating a single time-lapse moving image and the exposure indicating the current brightness of a subject are smoothed, whereby the time-lapse moving image in which a change in brightness between images (frames) is smooth can be generated.

However, if smoothing of exposure is uniformly carried out without taking into consideration information about the acquisition of a time-lapse moving image, the time-lapse moving image with a brightness that is not intended by the user may be obtained. For example, in the case of capturing an image of a landscape at an image capture interval of one minute, if the degree of exposure smoothing is small, flickering in the time-lapse moving image becomes prominent due to a temporal change in outside light (e.g., passing of an automobile at night). On the other hand, in the case of capturing an image of a landscape at an image capture interval of five hours, if the degree of exposure smoothing is large, the brightness of a subject in the time-lapse moving image may be unnaturally low or high due to the effect of the exposure used in the past image capturing operation, even when the ambient light greatly changes. In the former case, when the image capture interval for intermittent image capturing is relatively short, it is assumed that a change in ambient light (outside light) between the past image capturing operation and the current image capturing operation is small, and thus it is necessary to control the exposure for image capturing so that a change in the exposure between the images included in the time-lapse moving image is as smooth as possible. In the latter case, if the image capture interval for intermittent image capturing is relatively long, it is assumed that a change in ambient light between the past image capturing operation and the current image capturing operation is large, and thus it is necessary to control the exposure so that a most proper exposure for each image capturing operation is obtained for the brightness of the subject in each image capturing operation. In this manner, the degree of smoothing of information about the exposure in the past image capturing operation is controlled in consideration of the image capture interval for intermittent image capturing, and the exposure for the current image capturing operation is set based on the smoothed information, which leads to an increase in the quality of the time-lapse moving image.

Accordingly, in the present exemplary embodiment, the degree of exposure smoothing is controlled based on the image capture interval for intermittent image capturing as information about the acquisition of a time-lapse moving image, whereby the quality of the time-lapse moving image is maintained and an unnatural change in the luminance of a subject is suppressed in the time-lapse moving image.

Figure 4:
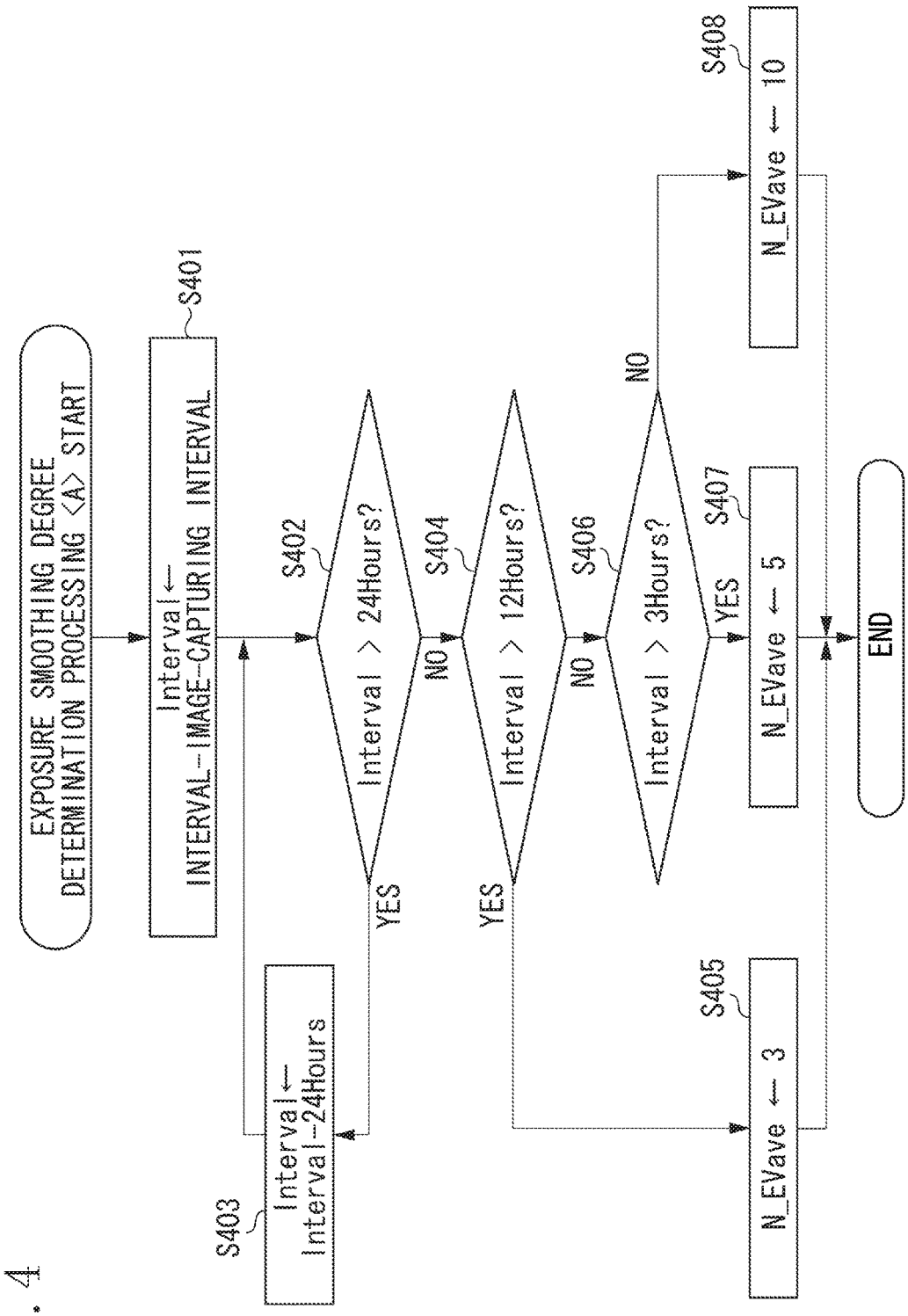
FIG. 4 is a flowchart illustrating exposure smoothing degree determination processing <A> according to an exemplary embodiment.

This processing will be described in detail below with reference to FIG. 4. FIG. 4 is a flowchart illustrating exposure smoothing degree determination processing <A> in step S307 illustrated in FIG. 3 according to a first exemplary embodiment. The processing illustrated in FIG. 4 is a flowchart illustrating a case where the exposure smoothing frame number N_EVave is determined based on the image capture interval (interval) set by the user. The term "exposure smoothing frame number" used in the present exemplary embodiment refers to the number of past image capturing operations with reference to the photometric value (or exposure) for determining the target exposure corresponding to each image capturing operation for acquiring a time-lapse image in the time-lapse mode.

As illustrated in FIG. 4, in step S401, the camera control unit 101 reads out the image capture interval (Interval) set by the user, and determines whether the image capture interval is longer than 24 hours in step S402. In a case where the camera control unit 101 determines that the image capture interval is longer than 24 hours (YES in step S402), the processing proceeds to step S403 and the camera control unit 101 subtracts 24 hours from the current image capture interval. Then, the processing returns to step S402. When the camera control unit 101 repeats the processing of steps S402 to S403 and in a case where the camera control unit 101 determines that the image capture interval is equal to or less than 24 hours (NO in step S402), the processing proceeds to step S404. The processing of steps S402 to S403 is a processing flowchart for determining the degree of actual change in ambient light by subtracting the Interval value from the actual image capture interval in units of 24 hours, assuming that the brightness of ambient light obtained every 24 hours is substantially the same.

Next, in step S404, the camera control unit 101 determines whether the image capture interval is longer than 12 hours. If the camera control unit 101 determines that the image capture interval is longer than 12 hours (YES in step S404), the processing proceeds to step S405, and the camera control unit 101 sets the exposure smoothing frame number N_EVave to "3" (exposure smoothing frame number N_EVave=3). If the camera control unit 101 determines that the image capture interval is equal to or less than 12 hours (NO in step S404), the processing proceeds to step S406.

Next, in step S406, the camera control unit 101 determines whether the image capture interval is longer than three hours. In a case where the camera control unit 101 determines that the image capture interval is longer than three hours (YES in step S406), the processing proceeds to step S407, and the camera control unit 101 sets the exposure smoothing frame number N_EVave to "5" (exposure smoothing frame number N_EVave=5). In a case where the camera control unit 101 determines that the image capture interval is equal to or less than three hours (NO in step S406), the processing proceeds to step S408, and the camera control unit 101 sets the exposure smoothing frame number N_EVave to "10" (exposure smoothing frame number N_EVave=10). The exposure smoothing degree determination processing according to the present exemplary embodiment is carried out as described above.

The exposure smoothing frame number N_EVave set in accordance with the processing flowchart illustrated in FIG. 4 indicates the number of exposures during past image capturing operations (for images used to generate a single time-lapse moving image) to be referenced during setting of the target exposure. As the exposure smoothing frame number increases, the reference degree of exposure to be referenced during past image capturing operations increases and thus the degree of exposure smoothing is larger. As the exposure smoothing frame number decreases, the degree of exposure smoothing is smaller.

Figure 5:
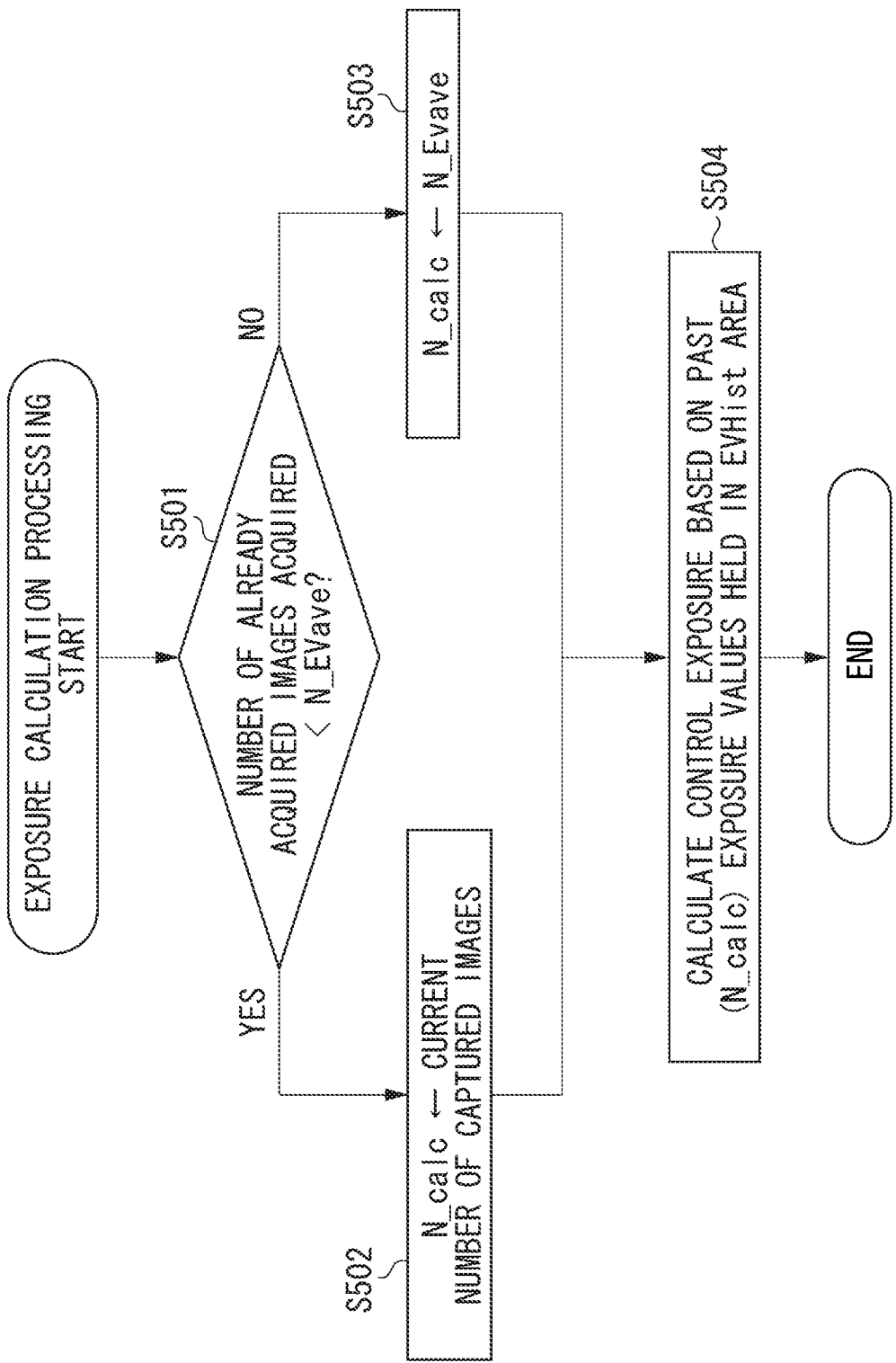
FIG. 5 is a flowchart illustrating exposure calculation processing according to an exemplary embodiment.

Referring again to FIG. 3, the target value setting unit 116 executes exposure calculation processing in step S308 after the exposure smoothing frame number is set in the processing of step S307. This processing will be described in detail below with reference to FIG. 5. FIG. 5 is a flowchart illustrating the exposure calculation processing according to an exemplary embodiment.

As illustrated in FIG. 5, in step S501, the target value setting unit 116 determines whether the number of already acquired time-lapse images (the number of captured images) is smaller than the exposure smoothing frame number N_EVave, as images to be used for generating a single time-lapse moving image.

In a case where the target value setting unit 116 determines that the number of frames of already captured time-lapse images is smaller than the exposure smoothing frame number (YES in step 3501), in step S502, the target value setting unit 116 sets the number of frames of already acquired time-lapse images as N_calc. In a case where the target value setting unit 116 determines that the number of time-lapse images is equal to or greater than the exposure smoothing frame number (NO in step S501), in step S503, the target value setting unit 116 sets the previously calculated exposure smoothing frame number N_EVave as N_calc. In this case, N_calc represents the number of photometric values corresponding to the recorded images to be actually referenced for calculating the target exposure corresponding to the subsequent image capturing operation.

Next, in step 3504, the target value setting unit 116 refers to the photometric values corresponding to N_calc from each EVHist area in the memory 102 in which the photometric values used during the past image capturing operations are held, and determines a control photometric value for subsequently acquiring time-lapse images based on the referenced photometric values. When N_calc is set to "5" (N_calc=5), assuming that the photometric values recorded in each EVHist area are represented by EVHist[n] . . . , a control photometric value Bv is calculated by the following formula (1):

$$Bv=\{EVHist[n-4]+EVHist[n-3]+EVHist[n-2]+EVHist[n-1]+EVHist[n]\}/N\_calc \quad (1),$$

where n represents a natural number including 0. The calculated control photometric value is converted into an exposure, whereby the target exposure is calculated.

Figure 6A:
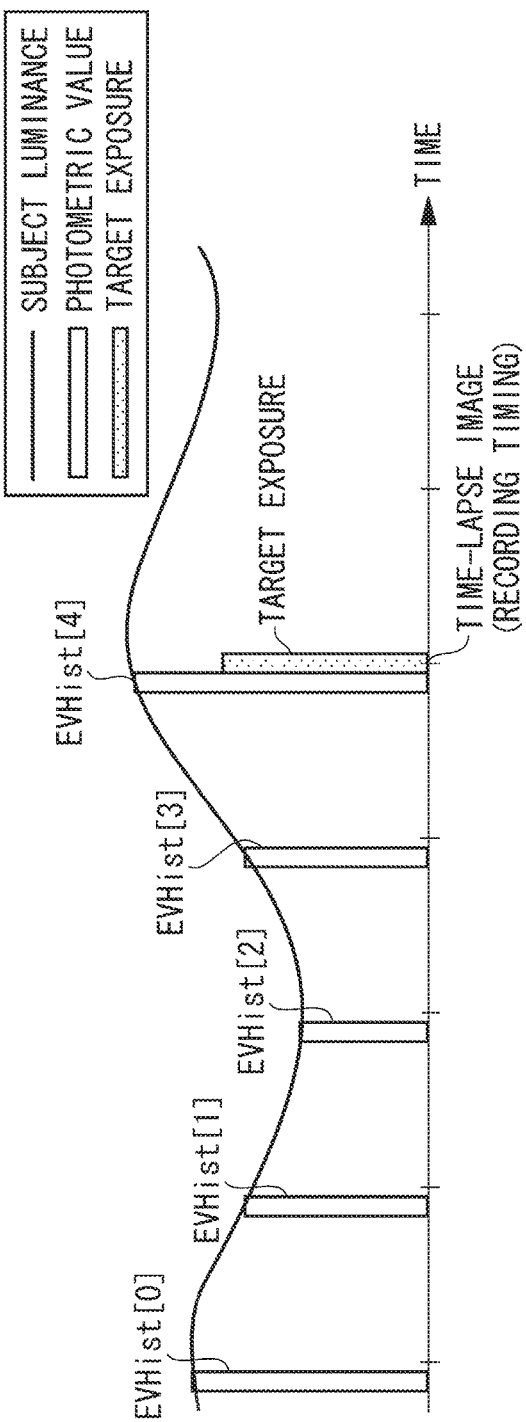
FIGS. 6A and 6B are graphs each illustrating smoothed exposure values in the time-lapse mode according to an exemplary embodiment.
Figure 6B:
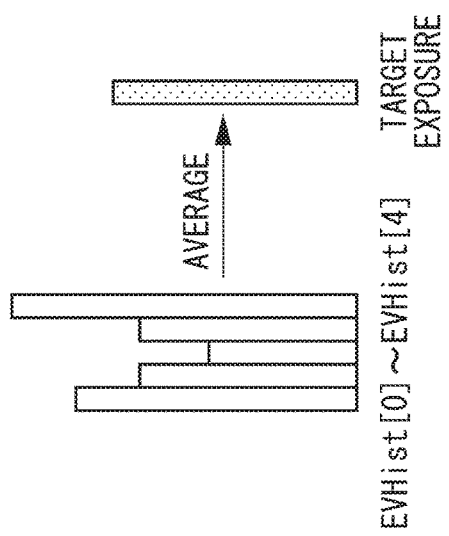

An example of the case where N_calc is set to "5" (N_calc=5) as described above will be described with reference to FIGS. 6A and 6B. FIGS. 6A and 6B are graphs each illustrating an example of smoothed exposure values in the time-lapse mode according to the present exemplary embodiment. FIG. 6A is a graph illustrating an example of the relationship between the actual target exposure and photometric values recorded on each EVHist area according to the present exemplary embodiment. FIG. 6B is a diagram illustrating an example of the relationship between the actual target exposure and a plurality of photometric values recorded on each EVHist area according to the present exemplary embodiment.

As illustrated in FIGS. 6A and 6B, EVHist area[n] representing the photometric value corresponding to the current image capturing operation (first image capturing operation) is set as EVHist[4]. In this case, an average value of the photometric values EVHist[0] to EVHist[4], which are obtained during five past time-lapse image capturing operations, including the photometric value and the photometric values respectively corresponding to the image capturing operations prior to the current image capturing operation to be executed for generating the same time-lapse moving image corresponds to the target exposure. In the example illustrated in FIGS. 6A and 6B, in view of the transition of the photometric values used during the past image capturing operations, the value of the target exposure corresponding to the timing when EVHist[4] is acquired is relatively lower than the actual brightness of a subject at the timing.

Figure 7:
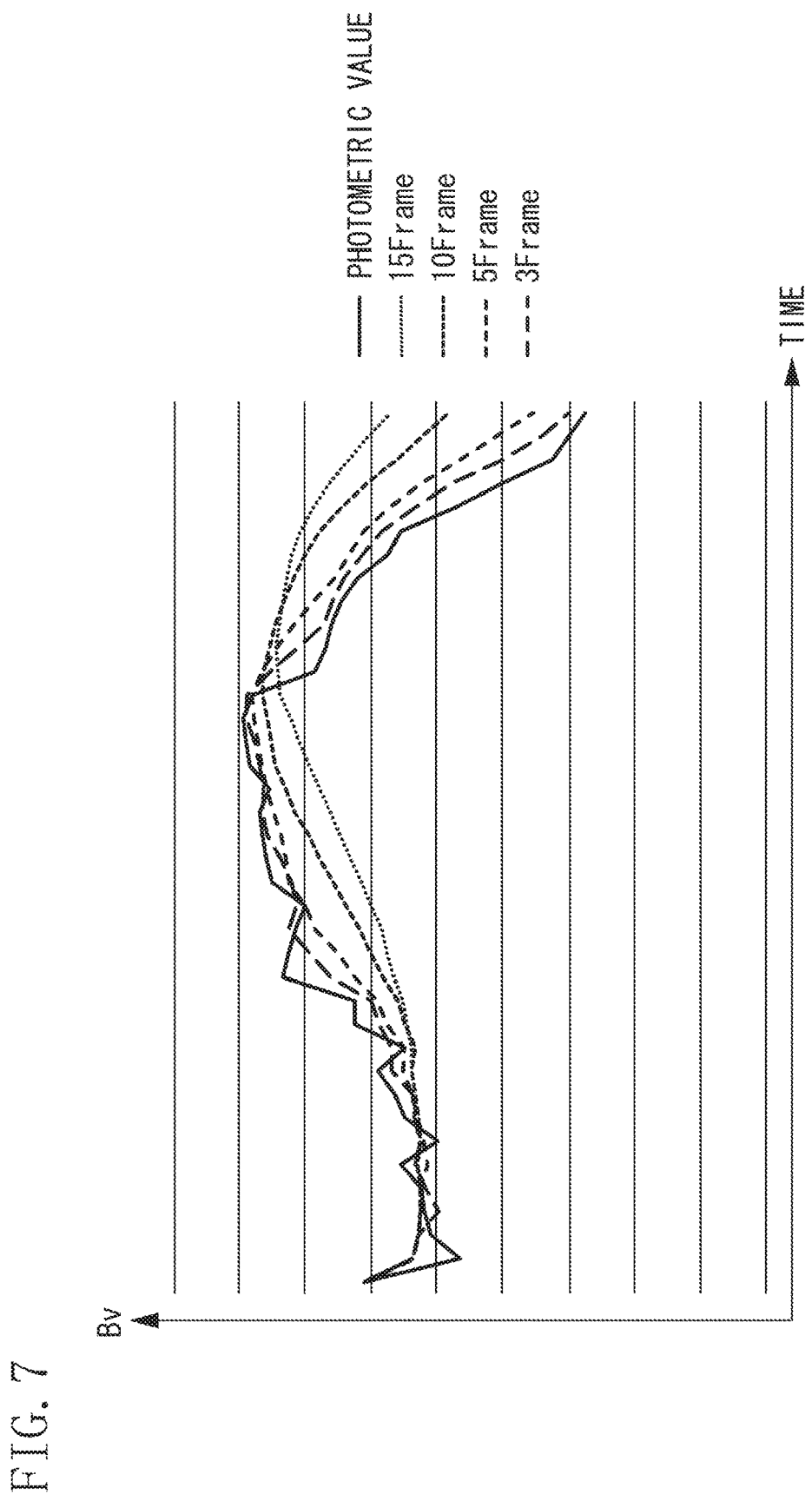
FIG. 7 is a graph illustrating a relationship between a difference between exposure smoothing frame numbers and a transition of a target exposure according to an exemplary embodiment.

FIG. 7 is a graph illustrating an example of the relationship between a difference between exposure smoothing frames and a transition of a target exposure according to the present exemplary embodiment. In FIG. 7, the horizontal axis represents a lapse of time and the vertical axis represents the magnitude of the photometric value (luminance value). A solid line in the graph illustrated in FIG. 7 represents a temporal change in the actual photometric value of a subject, and dotted lines each represent a temporal change in the control photometric value for each exposure smoothing frame number. As illustrated in FIG. 7, as the exposure smoothing frame number increases, the control photometric value transits smoothly with respect to the actual photometric value at each timing, so that the target exposure also changes smoothly. On the other hand, as the exposure smoothing frame number decreases, the control photometric value transits sharply with respect to the actual photometric value at each timing, so that the target exposure changes sharply. Accordingly, a proper exposure is set for the brightness of a subject at each timing.

Referring again to FIG. 3, after the target exposure is determined in step S308, in step S309, the camera control unit 101 controls each unit of the camera 1 to change the exposure for image capturing so that the determined target exposure is obtained. In step S310, the camera control unit 101 controls each unit of the camera 1 to capture images of a subject to acquire time-lapse images.

After the acquisition of time-lapse images is completed, in step S311, the camera control unit 101 determines whether the termination of intermittent image capturing is instructed. In the present exemplary embodiment, the camera control unit 101 determines that the termination of intermittent image capturing is instructed when the preliminarily set total number of image capturing operations is reached. In addition, for example, it may be detected whether the termination of image capturing is instructed by the user before the total number of image capturing operations is reached, to determine whether intermittent image capturing is terminated, depending on the presence or absence of the instruction.

In a case where the camera control unit 101 determines that the termination of image capturing is instructed (YES in step S311), in step S312, the camera control unit 101 generates a time-lapse moving image by sequentially connecting the acquired time-lapse images, and then terminates the image capturing processing. In a case where the camera control unit 101 determines that the termination of image capturing is not instructed (NO in step S311), the processing returns to step S304 to repeat each processing described above. The image capturing processing in the time-lapse mode according to the present exemplary embodiment is carried out as described above.

In the present exemplary embodiment, the photometric values used during the past image capturing operations are referenced for exposure smoothing in the time-lapse mode, but instead the exposures used during the past image capturing operations may be referenced. In this case, information about the target exposure obtained in step S308 so as to correspond to the acquired time-lapse images in each EVHist area is recorded in a manner associated with information about the order of image capturing, and the photometric value calculated in step S305 is converted into an exposure (e.g., converted into an APEX unit), whereby the exposure calculation processing is executed.

As described above, the camera 1 according to the present exemplary embodiment is configured to control the degree of exposure smoothing for capturing images for a time-lapse moving image, based on the image capture interval for capturing images for the time-lapse moving image. More specifically, the camera 1 according to the present exemplary embodiment sets the degree of exposure smoothing for capturing images for a time-lapse moving image at a second interval, which is shorter than a first interval, to be larger than the degree of exposure smoothing for capturing images for a time-lapse moving image at the first interval. With this configuration, the camera 1 according to the present exemplary embodiment can prevent images of respective frame in the time-lapse moving image from having an unnatural brightness with respect to a change in the luminance of a subject, while preventing unnatural flickering from occurring in the time-lapse moving image.

Exemplary embodiments of the present disclosure have been described above. However, the present invention is not limited to the exemplary embodiments described above and can be modified and altered in various ways within the scope of the disclosure. For example, the exemplary embodiment described above illustrates the case where the image capture interval for capturing images for a time-lapse moving image is referenced in the exposure smoothing degree determination processing, but instead the exposure smoothing frame number may be determined based on information for acquiring a time-lapse moving image, other than the image capture interval.

Figure 8:
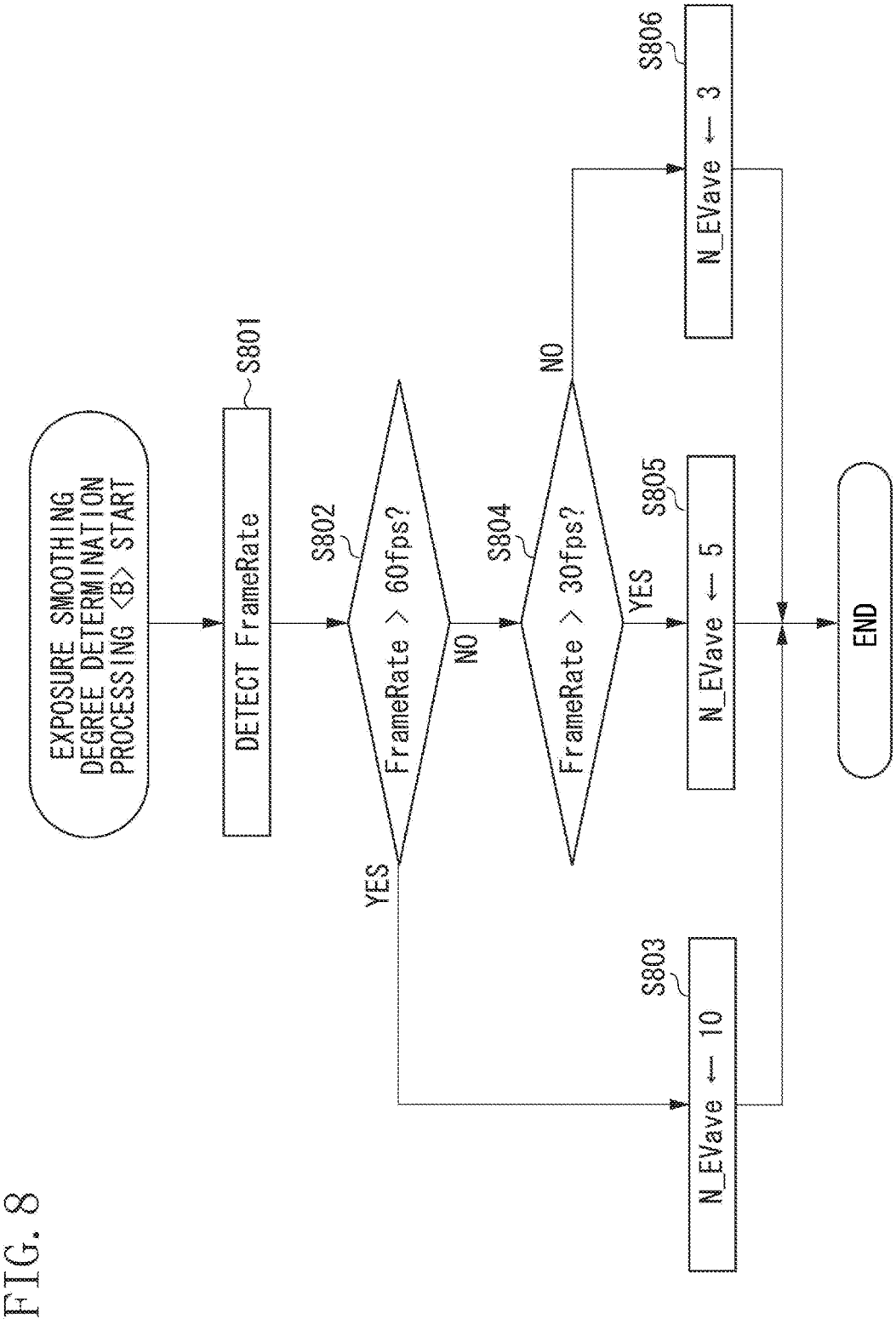
FIG. 8 is a flowchart illustrating exposure smoothing degree determination processing <B> according to a second exemplary embodiment.

A configuration for determining the exposure smoothing frame number based on a frame rate of a time-lapse moving image to be acquired as information about the acquisition of the time-lapse moving image according to a second exemplary embodiment will be described with reference to FIG. 8. FIG. 8 is a flowchart illustrating a processing flowchart of exposure smoothing degree determination processing <B> according to the second exemplary embodiment, in which the exposure smoothing frame number N_EVave is determined based on the frame rate of the time-lapse moving image.

In general, a time interval for frames to be displayed becomes shorter as the frame rate of a moving image increases, so that flickering due to a difference in brightness between frames becomes prominent. Accordingly, in the second exemplary embodiment, the degree of exposure smoothing is increased as the frame rate of a time-lapse moving image to be acquired increases, and the degree of exposure smoothing is reduced as the frame rate decreases. This processing will be described in detail below.

As illustrated in FIG. 8, in step S801, the camera control unit 101 detects a frame rate (FrameRate) of a time-lapse moving image to be acquired. When the user can set the frame rate of the time-lapse moving image, the frame rate preliminarily set by the user is detected. When the user can set a video system (e.g., NTSC or PAL), the frame rate corresponding to the video system set by the user is detected.

Next, in step S802, the camera control unit 101 determines whether the previously detected frame rate is higher than 60 frames per second (fps). In a case where the camera control unit 101 determines that the frame rate is higher than 60 fps (YES in step S802), in step S803, the camera control unit 101 sets the exposure smoothing frame number N_EVave to "10" (exposure smoothing frame number N_EVave=10). In a case where the camera control unit 101 determines that the frame rate is equal to or lower than 60 fps (NO in step S802), the processing proceeds to step S804.

Next, in step S804, the camera control unit 101 determines whether the detected frame rate is higher than 30 fps. In a case where the camera control unit 101 determines that the frame rate is higher than 30 fps (YES in step S804), in step S805, the camera control unit 101 sets the exposure smoothing frame number N_EVave to "5" (exposure smoothing frame number N_EVave=5). In a case where the camera control unit 101 determines that the frame rate is equal to or less than 30 fps (NO in step S804), in step S806, the camera control unit 101 sets the exposure smoothing frame number N_EVave to "3" (exposure smoothing frame number N_EVave=3).

Figure 9:
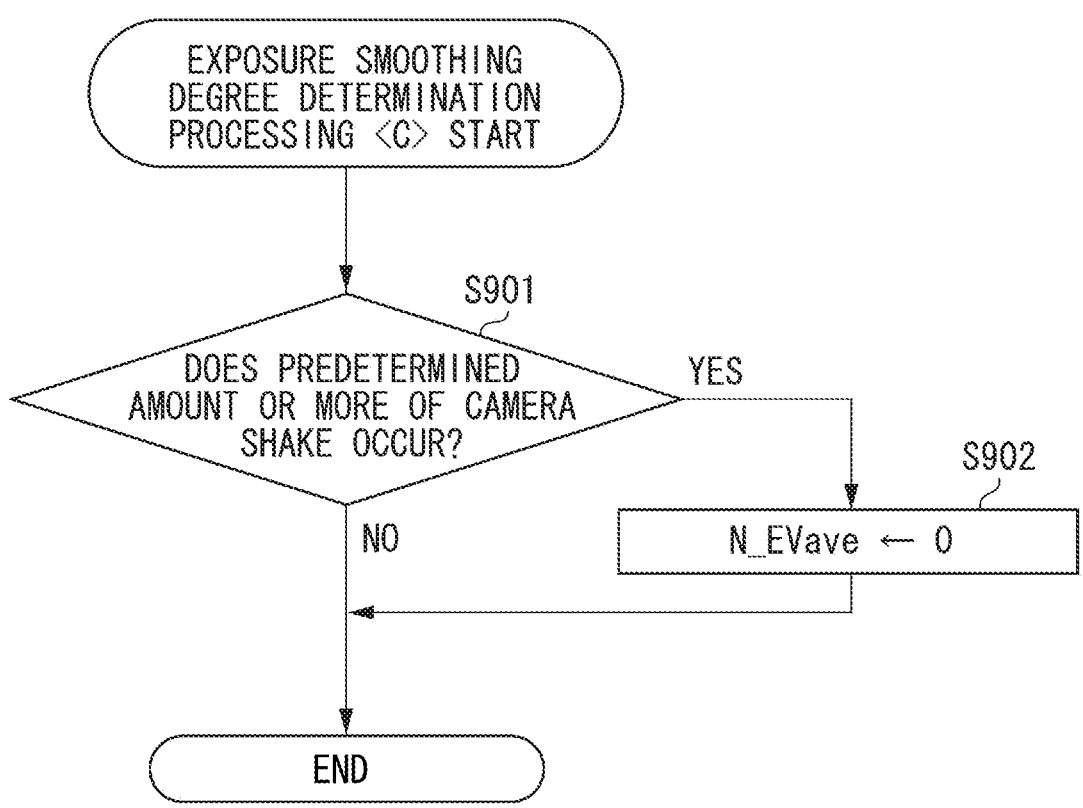
FIG. 9 is a flowchart illustrating exposure smoothing degree determination processing <C> according to a third exemplary embodiment.

A configuration for determining the exposure smoothing frame number based on the amount of shake of the camera 1 as information about the acquisition of a time-lapse moving image according to a third exemplary embodiment will be described with reference to FIG. 9. FIG. 9 is a flowchart illustrating a processing flowchart of exposure smoothing degree determination processing <C> according to the third exemplary embodiment, in which the exposure smoothing frame number N_EVave is determined based on the amount of shake of the image capturing apparatus.

Assume that the processing illustrated in FIG. 9 is executed subsequently to the exposure smoothing degree determination processing <A> and <B> illustrated in FIG. 4 and (or) FIG. 8. However, only the exposure smoothing degree determination processing illustrated in FIG. 9 may be executed. As illustrated FIG. 9, in step S901, the camera control unit 101 determines whether a predetermined amount or more shake of the camera 1 occurs based on the detection result of the motion detection unit 117. In a case where the camera control unit 101 determines that the predetermined amount or more of shake of the camera 1 occurs (YES in step S901), in step S902, the camera control unit 101 sets the exposure smoothing frame number N_EVave to "0" (exposure smoothing frame number N_EVave=0). In a case where the camera control unit 101 determines that the predetermined amount or more of shake of the camera 1 does not occur (NO in step S901), the processing is terminated without changing the previously determined exposure smoothing frame number in accordance with the processing flow illustrated in FIG. 4 and (or) FIG. 8.

In so-called walk-lapse image capturing in which interval image capturing is executed by the user who carries the image capturing apparatus, a change in a subject (a change in composition) becomes more conspicuous than a change in exposure in a moving image generated based on the interval image capturing. Accordingly, during walk-lapse image capturing, a change in a subject can be more effectively recorded when the exposure control is executed so that the degree of exposure smoothing is reduced to approach a proper exposure for each image capturing operation. Accordingly, in the third exemplary embodiment illustrated in FIG. 9, in a case where the predetermined amount or more of shake of the camera 1 occurs, it is determined that walk-lapse image capturing is carried out, and the exposure smoothing frame number is set to "O".

The exposure smoothing frame number set in this case may be any value other than "0". In this case, the exposure smoothing frame number is preferably set to a value smaller than a lower limit that can be set in the processing illustrated in FIGS. 4 and 8.

When the walk-lapse mode can be set as one of the image capturing modes of the camera 1, it may be detected whether the walk-lapse mode is set, instead of detecting the amount of shake of the camera 1. In this case, in a case where the camera control unit 101 detects that the walk-lapse mode is set, the processing proceeds to step S902 described above.

The exposure smoothing degree determination processing <A> to <C> described above may be executed by sequentially carrying out the processing. For example, the exposure smoothing degree determination processing <B> may be executed after the execution of the exposure smoothing degree determination processing <A>. In this case, the exposure smoothing frame number determined by the exposure smoothing degree determination processing <A> or the exposure smoothing degree determination processing <B> may be preferentially used, or the exposure smoothing frame number may be determined based on the result of each processing. For example, when the image capture interval is in a range from three to 12 hours and the frame rate of a time-lapse moving image is 60 fps, the exposure smoothing frame number N_EVave may be set to "7" (exposure smoothing frame number N_EVave=7).

The exemplary embodiments described above illustrate the case where, in the exposure smoothing degree determination processing, the photometric values corresponding to the past image capturing operations and the current image capturing operation are referenced for the subsequent image capturing operation in intermittent image capturing of a subject in the time-lapse mode. However, the present disclosure is not limited to this case. As data to be referenced, data on the brightness of a subject corresponding to each image capturing operation in the time-lapse mode may be used. For example, the degree of exposure smoothing may be set by referencing information about the actual exposure used during the past image capturing operations.

The exemplary embodiments described above illustrate the configuration in which a time-lapse moving image is generated in the camera 1 in the time-lapse mode. However, the present disclosure is not limited to this configuration. Specifically, the camera 1 may be configured to perform intermittent image capturing (interval image capturing) for acquiring images used for generating a time-lapse moving image and send the images of each frame acquired in image capturing to an external device, a computer on a network, or the like, to generate a time-lapse moving image.

The exemplary embodiments described above illustrate the configuration in which the camera control unit 101, the memory 102, the memory control unit 107, the photometry circuit 115, the target value setting unit 116, and the like operate in cooperation to control the operations of the camera 1. However, the present disclosure is not limited to this configuration. For example, control programs for the processing flowcharts illustrated in FIGS. 3 to 5 and FIGS. 8 and 9 are stored in the memory 102, and the control programs are executed by the camera control unit 101 and the like to control the operations of the camera 1.

Each of the programs may be formed into any one of an object code, a program executed by an interpreter, script data to be supplied to an operating system (OS), or the like as long as they have a function of the program. Various recording media can be used as the recording medium for supplying the program. For example, a hard disk, magnetic recording media such as a magnetic tape, and optical/magneto-optical recording media may be used.

The exemplary embodiments described above illustrate the case where a digital camera is adopted as an example of the image capturing apparatus for carrying out embodiments of the present disclosure. However, the present disclosure is not limited to this case. For example, image capturing apparatuses other than a digital camera, such as portable devices, such as a digital video camera and a smartphone, and a security camera, may be adopted.

(Other Exemplary Embodiments)

Various embodiments of the present disclosure can also be implemented by processing in which a program for implementing the functions of the exemplary embodiments described above is supplied to a system or apparatus via a network or a storage medium, and one or more processors in a computer of the system or apparatus load and execute the program. Embodiments of the present disclosure can also be implemented by a circuit (e.g., ASIC) for implementing one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-025381, filed Feb. 14, 2017, which is hereby incorporated by reference herein in its entirety.

What is claimed is:

1. An image capturing apparatus comprising:
an image sensor that captures an image of a subject;
one or more processors;
one or more non-transitory memories storing instructions that, when executed by the one or more processors, cause the image capturing apparatus to perform operations comprising;
setting an exposure for image capturing by the image sensor, wherein in a mode for acquiring a plurality of images for a time-lapse moving image by performing intermittent image capturing using the image sensor at preliminarily set predetermined image capture intervals, smoothing data on a brightness corresponding to a plurality of image capturing operations in the intermittent image capturing and setting an exposure for one image capturing operation in the intermittent image capturing according to the smoothed data; and
acquiring first information including at least one of an image capture interval for the intermittent image capturing, a frame rate of the moving image, and shake information during image capturing of the subject,
wherein, during a period between a first image capturing operation and a second image capturing operation subsequent to the first image capturing operation in the intermittent image capturing the setting includes determining a degree of the smoothing for the second image capturing operation based on the first information acquired by the acquiring, and the data on a brightness corresponding to the plurality of image capturing operations including the first image capturing operation.

2. The image capturing apparatus according to claim 1, wherein the data on the brightness indicates photometric values obtained for each of the plurality of image capturing operations, and
wherein the setting includes changing the degree of the smoothing by changing, according to the first information, the number of image capturing operations corresponding to the photometric values to be smoothed.

3. The image capturing apparatus according to claim 1, wherein the data on the brightness indicates information about exposures each corresponding to a different one of the plurality of image capturing operations, and
wherein the setting includes changing the degree of the smoothing by changing, according to the first information, the number of image capturing operations corresponding to the information about the exposures to be smoothed.

4. The image capturing apparatus according to claim 1, wherein the setting includes controlling, based on the first information acquired by the acquiring, the degree of the smoothing in such a manner that the degree of the smoothing is set larger in a case of a second interval in comparison with a case of a first interval, the first and second intervals each having an image capturing interval for continuous image capturing operations in the intermittent image capturing, the image capturing interval of the second interval being shorter than the image capturing interval of a first interval,.

5. The image capturing apparatus according to claim 1, wherein the setting includes controlling, based on the first information acquired by the acquiring, the degree of the smoothing in such a manner that the degree of the smoothing is set smaller in a case where the frame rate of the time-lapse moving image is a second rate in comparison with a case where the frame rate of the moving image is a first rate, the second rate being lower than the first rate.

6. The image capturing apparatus according to claim 1, wherein the setting includes controlling, based on the acquired first information, the degree of the smoothing in such a manner that the degree of the smoothing is set smaller in a case where a predetermined amount or more of image capturing apparatus shake occurs during image capturing of the subject in comparison with a case where an amount of image capturing apparatus shake less than the predetermined amount occurs during image capturing of the subject.

7. The image capturing apparatus according to claim 1, wherein the operations further comprise generating the time-lapse moving image using a plurality of images acquired in the mode.

8. The image capturing apparatus according to claim 1, wherein the operations further comprise controlling the one image capturing operation by the image sensor, according to an exposure set by the setting unit.

9. The image capturing apparatus according to claim 1, wherein the operations further comprise recording a plurality of images on a recording medium, the plurality of images being obtained by the intermittent image capturing in the mode.

10. The image capturing apparatus according to claim 1, wherein the operations further comprise receiving an instruction for a user to arbitrarily set an image capture interval for the intermittent image capturing in the mode.

11. A control method for an image capturing apparatus including an image sensor configured to capture an image of a subject, the control method comprising:
setting an exposure for image capturing by the image sensor, and in a mode for acquiring a plurality of images for a time-lapse moving image by performing intermittent image capturing using the image sensor at preliminarily set predetermined image capture intervals, smoothing data on a brightness corresponding to a plurality of image capturing operations in the intermittent image capturing, and setting an exposure for one image capturing operation in the intermittent image capturing according to the smoothed data; and
acquiring first information including at least one of an image capture interval for the intermittent image capturing, a frame rate of the moving image, and shake information during image capturing of the subject,
wherein, during a period between a first image capturing operation and a second image capturing operation subsequent to the first image capturing operation in the intermittent image capturing, the setting includes determining a degree of the smoothing for the second image capturing operation based on the first information acquired in the acquiring, and the data on a brightness corresponding to the plurality of image capturing operations including the first image capturing operation.

12. A non-transitory computer-readable storage medium storing a computer-readable program for causing a computer to execute a control method for an image capturing apparatus including an image sensor configured to capture an image of a subject, the control method comprising:
setting an exposure for image capturing by the image sensor, and in a mode for acquiring a plurality of images for a time-lapse moving image by performing intermittent image capturing using the image sensor at preliminarily set predetermined image capture intervals, smoothing data on a brightness corresponding to a plurality of image capturing operations in the intermittent image capturing, and setting an exposure for one image capturing operation in the intermittent image capturing according to the smoothed data; and
acquiring first information including at least one of an image capture interval for the intermittent image capturing, a frame rate of the moving image, and shake information during image capturing of the subject,
wherein, during a period between a first image capturing operation and a second image capturing operation subsequent to the first image capturing operation in the intermittent image capturing, the setting includes determining a degree of the smoothing for the second image capturing operation based on the first information acquired in the acquiring, and the data on a brightness corresponding to the plurality of image capturing operations including the first image capturing operation.

* * * * *